United States Patent [19]

Sata et al.

[11] 4,326,257
[45] Apr. 20, 1982

[54] TOOL BREAKDOWN DETECTING SYSTEM

[75] Inventors: Toshio Sata, Hoya; Katsumori Matsushima, Tokyo, both of Japan

[73] Assignee: Fujitsu Fanuc Ltd., Tokyo, Japan

[21] Appl. No.: 96,512

[22] Filed: Nov. 21, 1979

[30] Foreign Application Priority Data

Nov. 21, 1978 [JP] Japan .................................. 53-143617

[51] Int. Cl.³ ............................................ G06F 15/46
[52] U.S. Cl. .................................. 364/508; 364/551; 364/474; 73/104
[58] Field of Search ................ 364/508, 551, 474, 111; 73/104, 618, 619

[56] References Cited

U.S. PATENT DOCUMENTS

| | | | |
|---|---|---|---|
| 3,694,637 | 9/1972 | Edwin et al. | 364/508 |
| 3,819,916 | 6/1974 | Watanabe | 364/475 X |
| 3,834,615 | 9/1974 | Watanabe et al. | 364/508 X |
| 3,841,149 | 10/1974 | Edwin et al. | 364/508 X |
| 3,848,115 | 11/1974 | Sloane et al. | 364/508 |
| 3,872,285 | 3/1975 | Shum et al. | 364/508 X |
| 4,176,396 | 11/1979 | Howatt | 364/551 |

Primary Examiner—Edward J. Wise
Attorney, Agent, or Firm—Staas & Halsey

[57] ABSTRACT

A tool breakdown detecting system having at least one predicted standard pattern of change in the cutting resistance of a tool corresponding to a possible breakdown is prestored in a memory and compared with an actual change pattern of the cutting resistance of the tool monitored during working. When a coincidence is found between the prestored change pattern and the actual change pattern of the tool this indicates a breakdown of tool an alarm signal is generated. The alarm signal can activate a visual or audible alarm as well as regulate the further movement of the tool.

21 Claims, 6 Drawing Figures

TOOL BREAKDOWN DETECTING SYSTEM

BACKGROUND OF THE INVENTION

1. Field of the Invention

This invention relates to a tool breakdown detecting system for automatically detecting a breakdown of a tool attached to a numerical-controlled machine tool or the like during working to prevent various troubles which would otherwise result from the breakdown of the tool.

2. Description of the Prior Art

In an automatically controlled machine tool such as a numerical-controlled machine, if working is continued after the tool has broken down by some cause during working, a workpiece being machined becomes defective and, in addition, there is the possibility of incurring a serious trouble such as a breakdown of the machine tool itself. To avoid this, it is desired to detect the breakdown of the tool, but no satisfactory means has been developed for detecting the breakdown of the tool with sufficient accuracy.

SUMMARY OF THE INVENTION

An object of this invention is to provide a tool breakdown detecting system for automatically detecting a breakdown of the tool during working.

Another object of this invention is to provide a tool breakdown detecting system which detects automatically and rapidly a breakdown of the tool during working through utilization of a change pattern of the cutting resistance of the tool and prevents troubles which would otherwise result from the breakdown of the tool.

Briefly stated, in the tool breakdown detecting system of this invention, a change pattern of the cutting resistance of a tool which would be produced by its breakdown is stored as a standard change pattern in a memory, and the actual change pattern of the cutting resistance during working is compared with the standard change pattern to detect occurrence of a breakdown of the tool by detecting coincidence of them.

DESCRIPTION OF THE PREFERRED EMBODIMENTS

Figure 1:
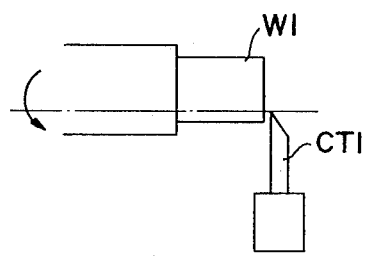
FIGS. 1 and 2 are, respectively, a diagram of a tool and a work piece and a graphical representation of the cutting resistance with time.
Figure 2:
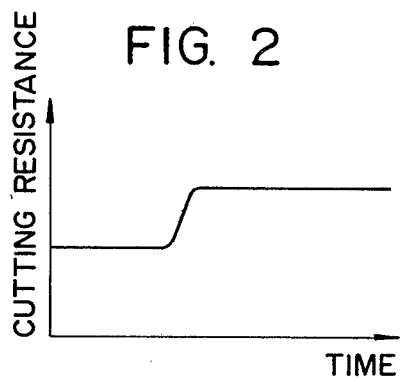
Figure 3:
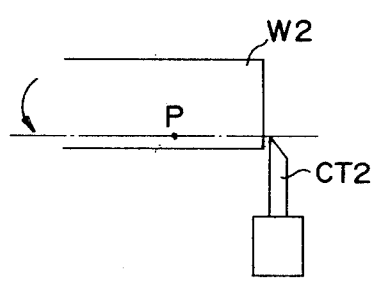
FIGS. 3 and 4 are, respectively, a diagram of a tool and another work piece and a graphical representation of the cutting resistance with time.
Figure 4:
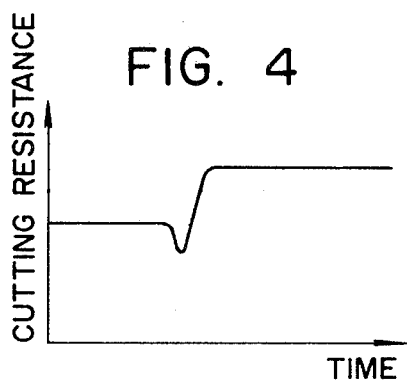

FIG. 1 illustrates a case where a work piece W1 having a stepped portion, driven in the direction of the arrow, is cut by a tool CT1 along the one-dot chain line, and FIG. 2 shows a change in the cutting resistance with time in this case. FIG. 3 illustrates a case where a columnar work piece W2 driven in the direction of the arrow is cut by a tool CT2 along the one-dot chain line, with the tool being broken down at a point P, and FIG. 4 shows a change in the cutting resistance with time in this case.

In the case of FIG. 1 in which nothing is wrong with the CT1 in the course of cutting work even if the work piece W1 has the stepped portion, the change in the cutting resistance with time merely presents such a characteristic as shown in FIG. 2 in which the cutting resistance abruptly increases at the stepped portion but thereafter remains constant. In the case where the tool CT2 is broken down during cutting work as shown in FIG. 3, the change in the cutting resistance presents, for example, such a characteristic as shown in FIG. 4 in which the cutting resistance decreases temporarily at the time of the breakdown of the tool but thereafter sharply increases. The reason for this is that in the case of a breakdown of the tool, the cutting resistance is decreased temporarily due to cracking of the tool tip or the like and is then abruptly increased due to the edge of the tool having no cutting ability.

The present invention makes use of such a particular cutting resistance change pattern produced in the case of a breakdown of the tool and is intended to detect the breakdown of the tool by successively comparing the particular or standard cutting resistance change pattern, which is supposed to appear in the case of a breakdown of the tool and which is stored in a memory, with the actual cutting resistance change pattern during working. Next, a description will be given of a method for comparing the stored standard cutting resistance change pattern with the actual cutting resistance change pattern during working.

Figure 5:
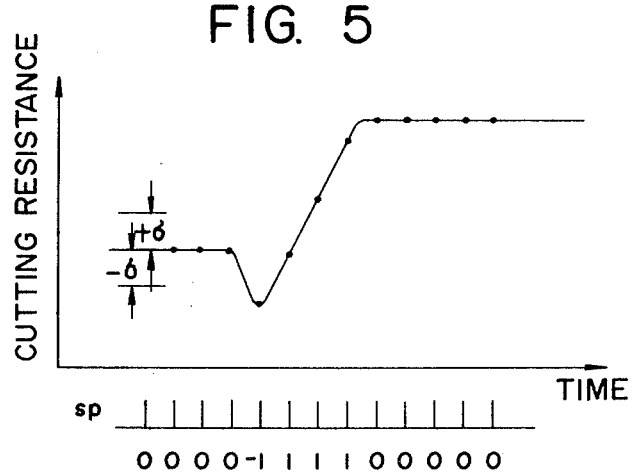
FIG. 5 is a graphical representation which shows an example of obtaining a change pattern from the cutting resistance of tool during working.

For example, as shown in FIG. 5, during working the cutting resistance is detected at all times and the detected cutting resistance value is read in response to each one of sampling pulses sp having such a period as shown in FIG. 5 and a difference between each sampled value and an immediately preceding one is obtained. Next, the relationship of the thus obtained difference in magnitude to a preset value $\sigma$ is coded by using the following relationship equations, and three values, 0, +1 and −1, are provided, respectively.

$$-\sigma \leq \text{(current sampled value)} - \text{(preceding sampled value)} \leq \sigma \rightarrow 0 \qquad (1)$$

$$\text{(current sampled value)} - \text{(preceding sample value)} > \sigma \rightarrow 1 \qquad (2)$$

$$\text{(current sampled value)} - \text{(preceding sample value)} < -\sigma \rightarrow -1 \qquad (3)$$

The value of $\sigma$ is determined in consideration of variations in the cutting resistance during normal cutting work.

Assuming that the value of $\sigma$, for example, such as shown in FIG. 5, is set as a result of the above consideration, a cutting resistance change pattern represented by the abovementioned three values becomes that shown at the lower part of FIG. 5; in the illustrated case, the progression (−1, 1, 1, 1) indicates a breakdown of the tool.

A plurality of standard cutting resistance change patterns, which are supposed to occur in the case of a breakdown of the tool, are converted into progressions of the abovementioned ternary composition, for example (−1, 1, 1, 1), (−1, 0, 1, 1), (−1, 1, 1, 0), etc., which are stored in a memory. By successively comparing these stored progressions with a progression obtained in actual working, their coincidence is detected. When such a coincidence is detected, it is decided that the tool is broken down.

In the above illustrated system and method, the cutting resistance change patterns are compared using progressions of four figures, but the number of figures may be selected as desired and the standard cutting resistance change patterns which are supposed to appear in the case of a breakdown of the tool are not limited specifically to the aforementioned ones.

Figure 6:
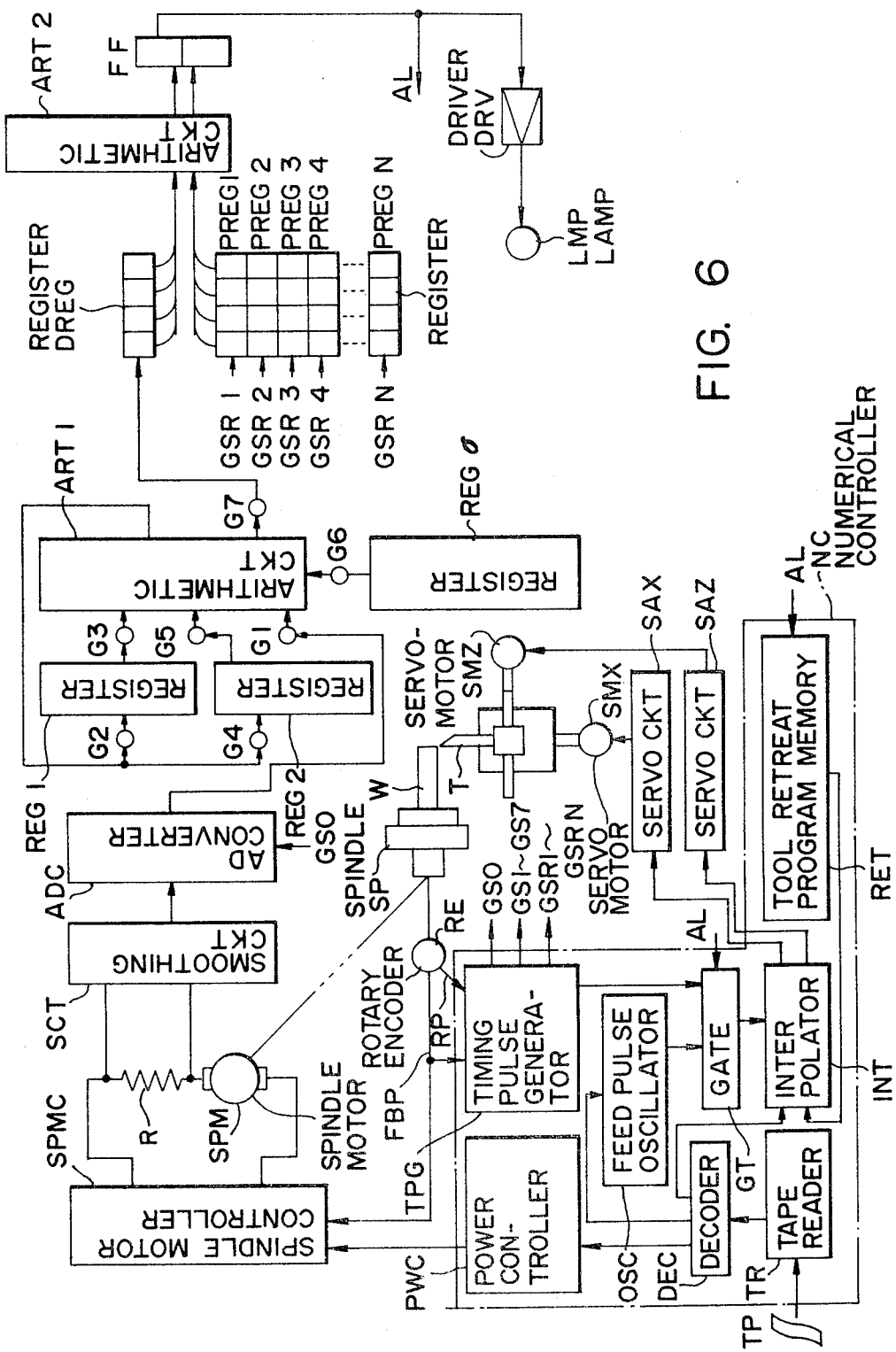
FIG. 6 is a block diagram illustrating an embodiment of the apparatus system in accordance with this invention.

FIG. 6 illustrates in block form an embodiment of the tool breakdown detecting system of the present invention based on the principles described above as being applied to a numericalcontrolled machine. In FIG. 6, reference character NC indicates a numerical controller; TP designates a command tape; TR identifies a tape reader; DEC denotes a decoder; OSC represents a feed pulse oscillator; INT shows an interpolator; PWC refers to a power controller; TPG indicates a timing pulse generator; RET designates a tool retreat program memory; SAX and SAZ identify servo circuits; SMX and SMZ denote servomotors; T represents a tool; W shows a work piece; SP refers to a spindle; SPMC indicates a spindle motor controller; SPM designates a spindle motor; R identifies a resistor; RE denotes a rotary encoder; SCT represents a smoothing circuit; ADC shows an A-D converter; ART1 and ART2 indicate arithmetic circuits; REG1, REG2, DREG, REG$\sigma$ and PREG1 to PREGN designate registers; FF identifies a flip-flop; DRV denotes a driver, LMP represents a lamp; and GT and G1 to G7 show gates.

The command tape TP, which has recorded thereon command values for the amount of feed and feedrate of the tool T, etc. and auxiliary function commands, such as command values for the number of revolutions of the spindle SP and so forth, is read by the tape reader TR of the numerical controller NC, and the command information read from the command tape TR is decoded by the decoder DEC. If the content thus decoded is directed to an auxiliary function command, it is provided to the power controller PWC; for example, if the auxiliary command is one for the number of revolutions of the spindle SP, the power controller PWC applies a number-of revolutions command to the spindle motor controller SPMC, controlling the spindle motor SPM, such as a DC motor or the like, to rotate at the commanded speed. In other words, the spindle motor controller SPMC controls the firing phase of a thyristor for current supply to the spindle motor SPM so that a speed detection signal FBP of the rotary encoder RE mounted on the spindle may coincide with the spindle speed command signal, as is well known in the art.

When the content of the tape decoded by the decoder DEC is a tool feedrate command, it is applied to the feed pulse oscillator OSC to determine its output pulse frequency. When the decoded content of the tape is the command value for the amount of feed of the tool, it is provided to the interpolator INT, which responds to the command information to distribute output pulses fed thereto from the feed pulse oscillator OSC via the gate GT. The distributed pulses are supplied to the servo circuits SAX and SAZ, which drive the servomotors SMX and SMZ to control the relative movement of a movable machine part, for example, the tool T to the work piece W, achieving desired working of the piece work W. Such an operation is already known in the art; therefore, no detailed description will herein be The cutting resistance of the tool T on the work piece W during working can be detected by various methods. In the present embodiment, the cutting resistance is detected by the voltage across the resistor R connected in series with the spindle motor SPM, utilizing the fact that the voltage is proportional to the cutting resistance. The smoothing circuit SCT is provided to remove noise components contained in the detected voltage across the resistor R and is formed by a low-pass filter, which applies an analog output signal to the A-D converter ADC. The A-D converter ADC converts the analog detection signal from the smoothing circuit SCT into digital form in synchronization with a sampling signal GSO which is outputted from the timing pulse generator TPG upon each input thereto of a one-rotation signal RP from the rotary encoder RE. In other words, the cutting resistance value during working is read in a digital form by the smoothing circuit SCT and the A-D converter ADC for each rotation of the spindle SP.

The digital output signal from the A-D converter ADC is stored in the register REG1 via the gate circuit G1, the arithmetic circuit ART1 and the gate circuit G2 using gate signals GS1 to GS7 provided to the gate circuits G1 to G7 from the timing pulse generator TPG. In the register REG2 there is stored a digital value of the cutting resistance obtained by the preceding sampling, and based on the sample values stored in the both registers REG1 and REG2, the arithmetic circuit ART1 performs the following calculation:

Content of register REG1 (current sample value)−Content of register REG2 (preceding sample value)

and stores the calculated result in the register REG2. Then, the arithmetic circuit ART1 makes a comparison between the content of the register REG2 and the preset value $\sigma$ stored in the register REG$\sigma$ and, in accordance with the result of comparison, provides one of the three values, 0, 1 and −1, as shown in the aforementioned equations (1), (2) and (3). The thus obtained value is set at a first stage of the register DREG via the gate circuit G7. Thereafter, the arithmetic circuit ART1 performs the same operation as described above for each rotation of the spindle SP; namely, any one of the values 0, 1 and −1 is applied to the register DREG with the preceding value being sequentially shifted, resulting in the actual cutting resistance change pattern of the tool being stored in the register DREG in the aforementioned ternary composition.

In the registers PREG1 to PREGN, there are stored various kinds of standard cutting resistance change patterns which would appear in actual cutting resistance in the case of a breakdown of the tool, each pattern having a ternary composition of four figures. Upon each shift of the content of the register DREG by writing therein new information at the digit of its first stage, the arithmetic circuit ART2 makes a comparison between each of the contents of the registers PREG1 to PREGN, successively outputted by output timing signals GSR1 to GSRN from the timing pulse generator TPG, with the content of the register DREG. When the content of the register DREG and the content of any of the registers PREG1 to PREGN coincide with each other, the arithmetic circuit ART2 sets the flip-flop FF to generate a tool breakdown signal, that is, an alarm signal AL.

This alarm signal AL can be utilized in various ways. In the present embodiment, the alarm signal AL is applied via the driver DRV to the alarm lamp LMP to light it and, at the same time, the signal AL is provided to the gate circuit GT of the numerical controller NC for closing the gate circuit GT, interrupting the feed pulse supply to the interpolator INT, and thus stopping the feed of the tool T. Further, for quickly retracting the tool T, the tool retreat program memory RET is activated by the alarm signal AL to provide a tool retract command value to the interpolator INT, thereby returning the tool T to its predetermined position, for example, a tool change point.

In the foregoing embodiment, the detection of cutting resistance is achieved by detecting the voltage across the resistor R connected in series with the spindle motor SPM. However, the present invention is not limited specifically to the above method and other known detecting methods can be employed. It is possible to detect the cutting resistance, for example, by installing a strain gauge on the tool T to detect a voltage corresponding to a strain of the tool T.

As has been described in the foregoing, in the present invention utilizing the fact that a peculiar cutting resistance change pattern is provided when a tool breaks down, a comparison is always made between a predicted standard cutting resistance change pattern in the case of a breakdown of the tool and the actual cutting resistance change pattern detected at all times during working, and coincidence of the two patterns is regarded as indicative of the breakdown of the tool; namely, the breakdown of the tool can automatically be detected during working, enabling prevention of various troubles which would otherwise result from the breakdown of tool. Accordingly, the tool breakdown detecting system of this invention is of great utility when applied to a machine tool such as a numerical-controlled machine.

It will be apparent that many modifications and variations may be effected without departing from the scope of the novel concepts of this invention.

What is claimed is:

1. A tool breakdown detecting system comprising:
    memory means for storing at least one predetermined change pattern of the cutting resistance of a tool corresponding to a tool breakdown condition during working;
    means for detecting the actual cutting resistance of the tool during working and forming a change pattern of the actual cutting resistance of the tool; and
    comparing means for comparing the predetermined change pattern stored in the memory means with the actual change pattern of the cutting resistance of the tool during working, wherein coincidence of the two change patterns thus compared indicates a tool breakdown condition.

2. A tool breakdown detecting system according to claim 1, wherein the detecting and forming means detects and samples the cutting resistance and, for each sampling, a difference is obtained between the currently sampled value and the previously sampled one, and wherein the difference is coded and used to form the change pattern of the cutting resistance.

3. A tool breakdown detecting system according to claim 1, further comprising means for retreating the tool and wherein the comparing means is operatively connected to the tool retreating means and wherein the predetermined change pattern stored in the memory and the change pattern of the cutting resistance during working are compared and, in the case of coincidence, the tool is retreated.

4. A system for automatically detecting a breakdown of a tool during working comprising:
    means for detecting cutting resistance of the tool during working;
    means operatively connected to the detecting means for sampling the cutting resistance detected by the detecting means;
    means operatively connected to the sampling means for storing sampled values obtained by the sampling means;
    arithmetic means operatively connected to the storing means for calculating a difference between the sampled values stored in the storing means, the arithmetic means further comparing the difference calculated between the sampled values to a preset value and coding the difference between the sampled values on the basis of the compared preset value;
    first memory means operatively connected to the arithmetic means for storing a progression of figures coded by the arithmetic means representing the actual change pattern of the tool;
    second memory means for storing a progression of figures coded to represent at least one predetermined standard change pattern associated with a breakdown condition in the tool; and
    comparing means operatively connected to the first and second memory means for comparing the actual change pattern with the at least one predetermined standard change pattern, the comparing means having means for comparing the progressions of coded figures stored in the first and second memory means with each other and means for generating a tool breakdown signal when the compared progressions of figures coincide with each other.

5. A tool breakdown detecting system according to claim 4 wherein the arithmetic means calculates, compares and codes a difference between successively sampled values of the cutting resistance of the tool.

6. A tool breakdown detecting system according to claim 4 further comprising a motor for driving a work piece held in a spindle which is to be machined by the tool, means for supplying power to the spindle motor and wherein the detecting means comprises resistor means connected in series with the spindle motor and spindle power supplying means for generating a voltage signal proportional to the cutting resistance of the tool.

7. A tool breakdown detecting system according to claim 6 further comprising means operatively connected to the spindle motor and to the sampling means for generating a sampling signal wherein the sampling means samples the actual cutting resistance voltage signal in synchronization with the sampling signal.

8. A tool breakdown detecting system according to claim 7 wherein the sampling signal generating means includes a rotary encoder for providing a signal corresponding to a predetermined rotation by the motor of the spindle.

9. A tool breakdown detecting system according to claim 8 wherein the sampling signal is generated for each rotation of the spindle.

10. A tool breakdown detecting system according to claim 7 or 8 wherein the sampling means comprises an A-D convertor which provides a digital output signal from the sampled voltage signal in synchronization with the sampling signal.

11. A tool breakdown detecting system according to claim 10 further comprising means operatively connected between the resistor means and the A-D convertor for removing noise components contained in the detected voltage signal and applying an analog signal to the A-D convertor corresponding to the cutting resistance of the tool.

12. A tool breakdown detecting system according to claim 11 wherein the removing means comprises a pass band filter.

13. A tool breakdown detecting system according to claim 4 wherein the arithmetic means codes the difference between the sampled values in a ternary composition and the second memory means stores a progression of figures representing the at least one predetermined change pattern in a coded ternary composition.

14. A tool breakdown detecting system according to claim 4 or 13 wherein the progression of figures compared by the comparing means is four.

15. A system for automatically detecting a breakdown of a tool during working comprising:
   memory means for storing at least one predetermined change pattern of cutting resistance of the tool, with the change pattern corresponding to a tool breakdown condition during working;
   means for detecting actual cutting resistance of the tool during working;
   means for forming a change pattern of the actual cutting resistance of the tool detected by the detecting means; and
   comparing means for comparing the at least one predetermined change pattern stored in the memory means with the acutal cutting resistance change pattern formed by the forming means, wherein coincidence of the two change patterns compared by the comparing means indicates a tool breakdown condition.

16. A tool breakdown detecting system according to claim 15, wherein the forming means comprises sampling means for time sampling values of the actual cutting resistance of the tool detected by the detecting means and coding means for coding a difference between values of the actual cutting resistance time sampled by the sampling means, thereby forming the actual cutting resistance change pattern of the tool.

17. A tool breakdown detecting system according to claim 16, wherein the coding means codes a difference between successively sampled values of the actual cutting resistance of the tool.

18. A tool breakdown detecting system according to claim 15 further comprising means operatively connected to the comparing means for generating a tool breakdown signal when the two compared change patterns compared by the comparing means coincide with each other.

19. A tool breakdown detecting system according to claim 18 or 11 further comprising gate means operatively connected to the tool breakdown signal generating means for controlling supply of a feed pulse which causes the tool to be fed, wherein the gate means is activated by a tool breakdown signal to interrupt the feed pulse supply for stopping the feed of the tool.

20. A tool breakdown detecting system according to claim 18 or 4 further comprising means operatively connected to the tool breakdown signal generating means for retreating the tool to a predetermined position, wherein the tool retreating means is activated by a tool breakdown signal to retreat the tool.

21. A tool breakdown detecting system according to claim 18 or 4 further comprising means operatively connected to the tool breakdown signal generating means for providing a visual or audible signal when a tool breakdown signal is generated.

* * * * *

UNITED STATES PATENT AND TRADEMARK OFFICE
CERTIFICATE OF CORRECTION

PATENT NO. : 4,326,257
DATED : April 20, 1982
INVENTOR(S) : TOSHIO SATA ET AL.

It is certified that error appears in the above—identified patent and that said Letters Patent is hereby corrected as shown below:

```
Front page, [57] Abstract, line 4, delete "is"
      line 9, after "tool" insert --and--.
Col. 2, line 23, "the" (second occurrence) should be --this--.
Col. 3, line 13, "numericalcontrolled" should be
                 --numerical-controlled--;
        line 38, after "content" insert --of the tape--;
        line 43, "number-of revolutions" should be
                 --number-of-revolutions--;
        line 64, delete "piece";
        line 65, after "work" insert --piece--;
        line 66, after "be" insert --given--.
Col. 8, line 29, "18" should be --18, 15--.
```

Signed and Sealed this

Tenth Day of August 1982

[SEAL]

Attest:

GERALD J. MOSSINGHOFF

*Attesting Officer*  *Commissioner of Patents and Trademarks*